United States Patent

Kishita et al.

[11] Patent Number: 5,380,811
[45] Date of Patent: Jan. 10, 1995

[54] FLUORINE-CONTAINING ORGANOPOLYSILOXANE COMPOSITION

[75] Inventors: Hirofumi Kishita; Shinichi Sato, both of Annaka; Noriyuki Koike, Yoshii; Takashi Matsuda, Annaka, all of Japan

[73] Assignee: Shin-Etsu Chemical Co., Ltd., Tokyo, Japan

[21] Appl. No.: 70,223

[22] Filed: Jun. 2, 1993

[30] Foreign Application Priority Data

Jun. 2, 1992 [JP] Japan ................. 4-167026
Jun. 17, 1992 [JP] Japan ................. 4-183168

[51] Int. Cl.$^6$ ............... C08L 83/14; C08L 83/12
[52] U.S. Cl. ............... 528/15; 528/28; 528/31; 528/32; 528/41; 528/42; 525/431; 556/419
[58] Field of Search ............... 528/15, 28, 31, 32, 528/41, 42; 556/419; 525/431

[56] References Cited

U.S. PATENT DOCUMENTS 3,969,310 7/1976 Itoh et al. .
4,742,177 5/1988 Yamamoto et al. .
5,239,035 8/1993 Maxson ................. 528/115

FOREIGN PATENT DOCUMENTS 0527008 2/1993 European Pat. Off. .
2019387 1/1990 Japan ................. 556/419
2257976 1/1993 United Kingdom .

*Primary Examiner*—Melvyn I. Marquis
*Assistant Examiner*—Helen F. Lee
*Attorney, Agent, or Firm*—Oblon, Spivak, McClelland, Maier & Neustadt

[57] ABSTRACT

A room temperature curable fluorine-containing organopolysiloxane composition comprising:

(A) a fluorine-containing organosilicon compound having the general formula (1):

$$R^2-NHCO-[Rf-CONH-R^1-Q-R^1-NHCO]_a-Rf-CONH-R^2 \quad (1)$$

wherein a is an integer of 0 or more, Rf is a divalent perfluoroalkylene group or a divalent perfluoropolyether group, $R^1$ is a divalent hydrocarbon group, $R^2$ is a monovalent aliphatic unsaturated group-containing hydrocarbon group, and Q is a divalent siloxane group (B) a hydrogenorganopolysiloxane containing at least two Si—H groups in its molecule, and (C) a platinum family metal catalyst. The cured product of this composition exhibits good solvent resistance against non-polar solvents as well as polar solvents, in addition to good chemical resistance, heat resistance, release properties and water repellency.

8 Claims, No Drawings

FLUORINE-CONTAINING ORGANOPOLYSILOXANE COMPOSITION

BACKGROUND OF THE INVENTION

1. Field of the Invention

The present invention relates to a room temperature curable fluorine-containing organopolysiloxane composition that can be cured readily by allowing it to stand at room temperature or heating, and a cured product having good solvent resistance, chemical resistance and heat resistance obtained by curing the composition.

2. Description of the Prior Art

Silicone rubbers are excellent in properties such as electrical insulation, heat-resistance, cold-resistance and weatherability, and are used in a variety of fields. The silicone rubbers, however, have poor solvent resistance; if a silicone rubber comes into contact with a solvent or immersed in a solvent, it swells, seriously deforms and is lowered in rubber strength.

To improve the solvent resistance of silicone rubbers, a fluorosilicone rubber having a fluoroalkyl group such as 3,3,3-trifluoropropyl group was developed.

SUMMARY OF THE INVENTION

Although the fluorosilicone rubber mentioned above exhibits good solvent resistance against non-polar solvents, they very readily swell in polar solvents such as ketones and esters, and have poor solvent resistance with respect to polar solvents.

Thus, an object of the present invention is to provide a fluorine-containing silicone rubber composition that can produce fluorine-containing silicone rubbers having good solvent resistance against either of the nonpolar solvents and polar solvents, and the cured product thereof. The present invention provides a room temperature curable fluorine-containing organopolysiloxane composition comprising:

(A) a fluorine-containing organosilicon compound having the general formula (1):

$$R^2-NHCO-[Rf-CONH-R^1-Q-R^1-NHCO]_a-Rf-CONH-R^2 \quad (1)$$

wherein a is an integer of 0 or more, Rf is a divalent perfluoroalkylene group or a divalent perfluoropolyether group $R^1$ is a divalent hydrocarbon group, group, $R^2$ is a monovalent aliphatic unsaturated group-containing hydrocarbon group, and Q is a siloxane group having the general formula:

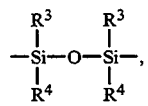
(2)

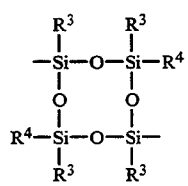
(3)

or

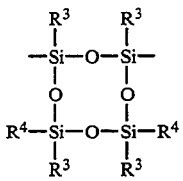
(4)

wherein in the formulas (2), (3) and (4) $R^3$ and $R^4$ may be the same or different and are each a monovalent unsubstituted or substituted hydrocarbon group, (B) a hydrogenorganopolysiloxane containing at least two Si—H groups in its molecule, and (C) a platinum family metal catalyst.

The present invention also provides a cured product obtained by curing the above-described room temperature curable fluorine-containing organopolysiloxane composition.

Since the cured product obtained by curing the room temperature curable fluorine-containing organopolysiloxane composition has a higher fluorine content, it exhibits good solvent resistance against either of nonpolar solvents and polar solvents as well as has good chemical resistance and heat resistance. Further, it has a low surface energy, it has good release properties and water repellency.

DETAILED DESCRIPTION OF PREFERRED EMBODIMENTS

The composition according to the present invention and its cured products are now described in detail.

(A) Fluorine-containing organosilicon compound

The fluorine-containing organosilicon compound, the component (A) of the composition according to the present invention, is a compound represented by the general formula (1) described above.

The Q in the general formula (1) stands for a divalent siloxane group represented by the general formula (2), (3) or (4). A plurality of $R^3$ and $R^4$ in the general formulas (2) to (4) may be the same or different and are an unsubstituted or substituted monovalent alkyl group, including, e.g., alkyl groups such as methyl, ethyl and propyl, cycloalkyl groups such as cyclohexyl, aryl groups such as phenyl and tolyl, alkenyl groups such as vinyl and allyl, and hydrocarbon groups of which hydrogen atoms have been substituted by halogen atoms, cyano groups or the like, such as 3,3,3-trifluoropropyl, 6,6,6,5,4,4,3,3-nonafluorohexyl, chloromethyl, 3-chloropropyl, 2-cyanoethyl and 3-cyanopropyl.

Typical examples of Q includes:

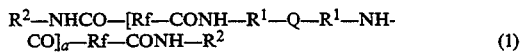

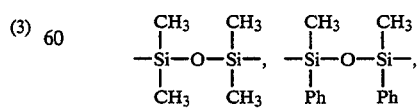

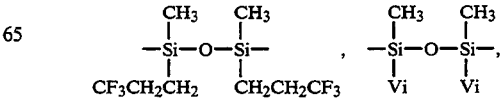

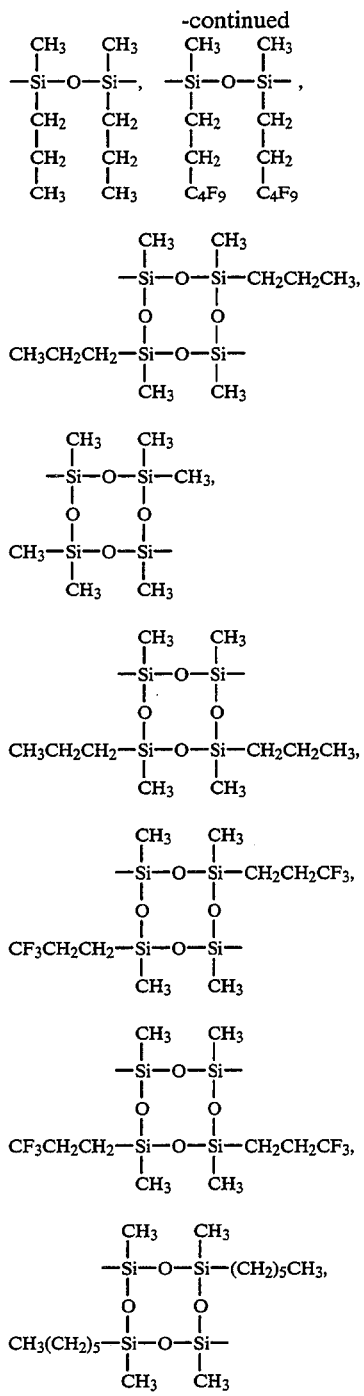

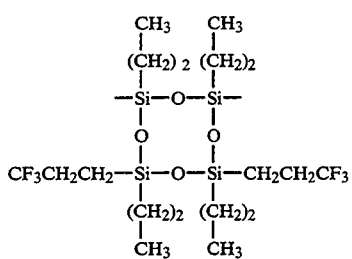

and wherein Ph stands for the phenyl group and Vi stands for the vinyl group.

The Rf in the general formula (1) is a divalent perfluoroalkylene group or a divalent perfluoropolyether group, and includes, for example, a group having the general formula (5):

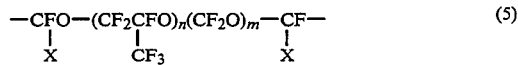

wherein m is an integer of 0 to 10, n is an integer of 2 to 50, and a plurality of X may be the same or different and are a fluorine atom or a group of $-CF_3$, a group having the general formula (6):

$$-(CF_2CF_2CF_2O)_k-CF_2CF_2- \qquad (6)$$

wherein k is an integer of 1 to 100, and a group having the general formula (7):

$$-(CF_2CFOCF_2)_e(CFOCF_2)_f(CF_2)_g(CF_2OCF)_h(CF_2OCF_2CF_2)_i- \qquad (7)$$
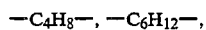

wherein e and i may be the same or different and are each 0 or 1, f and h may be the same or different and are each a integer of 0 to 30, and g is an integer of 0 to 8, provided that e, f, g, h and i satisfy $(e+f+g+h+i) \geq 1$, and a plurality of Y may be the same or different and are a fluorine atom or the group of 13 $CF_3$. The typical examples include:

$$-C_4H_8-, \quad -C_6H_{12}-,$$

$$-(CFOCF_2)_3-(CF_2OCF)_2,$$
$$\quad\;\; CF_3 \qquad\qquad CF_3$$

$$-(CFOCF_2)_{15}-(CF_2OCF)_{15}-,$$
$$\quad\;\; CF_3 \qquad\qquad CF_3$$

$$-CF_2CF_2OCF_2(CF_2)_2CF_2OCF_2CF_2-,$$

$$-CF_2CF_2OCF_2CFOCF_2(CF_2)_2CF_2OCFCF_2OCF_2CF_2-,$$
$$\qquad\qquad\qquad CF_3 \qquad\qquad\qquad CF_3$$

$$-CF_2O(CF_2CFO)_8-CF_2-$$
$$\qquad\qquad CF_3$$

and $$-(CF_2CF_2CF_2O)_8-CF_2CF_2-.$$

The $R^1$ in the general formula (1) is a divalent hydrocarbon group, which preferably has 1 to 8 carbon atoms, more preferably 1 to 6 carbon atoms, specifically including, e.g., alkylene groups and arylene groups such as:

$$-CH_2-, \quad -CH_2CH_2-, \quad -CH_2CH_2CH_2-, \quad -(CH_2)_6-,$$

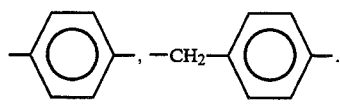

The $R^2$ in the general formula (1) is a monovalent hydrocarbon group containing an aliphatic unsaturated group, which preferably 2 to 10 carbon atoms, more preferably 2 to 6 carbon atoms, specifically including, e.g., alkenyl groups such as vinyl and allyl, cycloalkenyl groups such as cyclohexenyl and aryl groups such as styryl.

Further, a in the general formula (1) is an integer of 0 or more, preferably an integer of 0 to 20.

The fluorine-containing organosilicon compound (A) used in the present invention can be produced, for example, by reacting a compound having aryl groups at both ends represented by the formula (a):

$$CH_2\!=\!CHCH_2NHCO\!-\!Rf\!-\!CONHCH_2CH\!=\!CH_2 \qquad (a)$$

wherein Rf is as defined above, with a compound having the formula (b):

$$H\!-\!Q\!-\!H \qquad (b)$$

wherein Q is as defined above, in the presence of an addition catalyst normally at 50° to 150° C., preferably at 80° to 120° C.

The amount of the compound of the formula (a) is normally more than that of the compound of the formula (b) in molar basis. The more the amount of the compound of the formula (a) relative to that of the compound of the formula (b), the lower the molecular weight of the resulting polymer. The closer to the amount of the compound of the formula (b) the amount of the compound of the formula (a) is, the higher the molecular weight of the resulting polymer.

As said addition catalyst, an element of Group VIII in the periodic table and compounds containing the element may be exemplified. Specifically, it includes, for example, chloroplatinic acid, alcohol-modified chloroplatinic acid (See U.S. Pat. No. 3,220,972), complexes of chloroplatinic acid with an olefin (U.S. Pat. Nos. 3,159,601, 3,159,662 and 3,775,452), platinum black, palladium or the like supported on a carrier such as alumina, silica and carbon, rhodium-olefin complexes, and chlorotris(triphenylphosphine) rhodium (Wilkinson catalyst). The addition catalysts are preferably dissolved in an alcohol, ketone, ether or hydrocarbon solvent for use.

The component (A) which may be used in the present invention includes polymers with a low viscosity of several tens cSt at 25° C. and solid polymers with a high viscosity in a gum state. From the viewpoint of ease in handling, for example, gum-like polymers are desirable for heat cure rubber compositions and polymers with a viscosity of 100 to 100,000 cSt at 25° C. are desirable for liquid rubber compositions. If the component (A) has too low a viscosity, the resulting elastomers exhibit a small elongation and a poor balance among the properties.

(B) Hydrogenorganopolysiloxane

The hydrogenorganopolysiloxane having at least two Si—H groups in its molecule, the component (B) of the composition of the present invention, acts as a crosslinking agent. It specifically includes, for example,

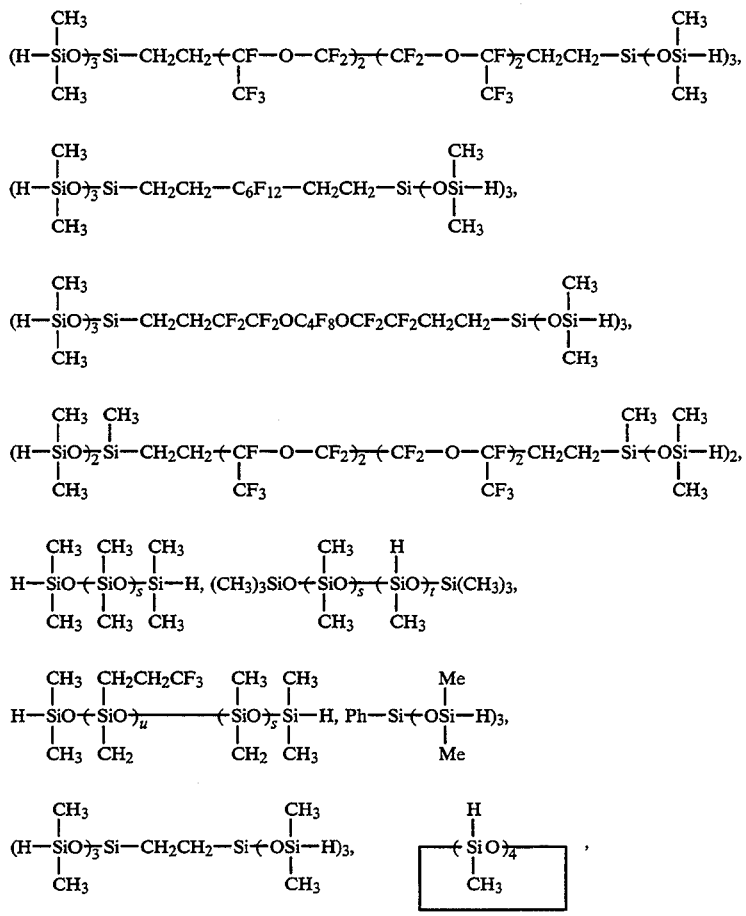

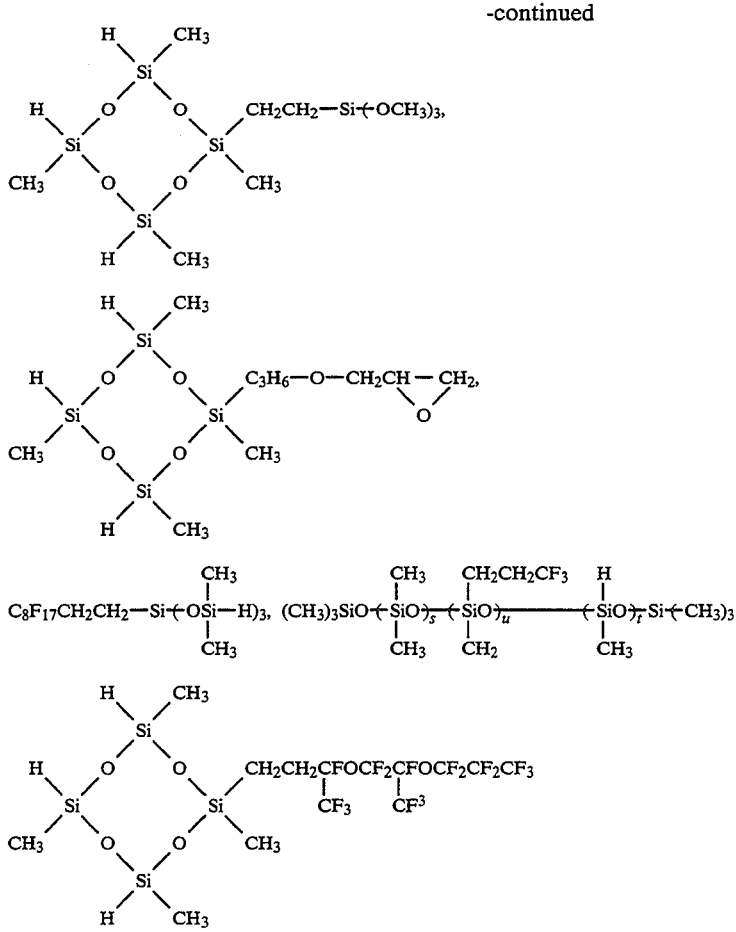

wherein s is an integer of 0 to 50, t is an integer of 1 to 10, u is an integer of 1 to 50, Me stands for the methyl group and Ph stands for the phenyl group.

The component (B) is preferably a compound having a fluorine-containing group. Such a compound having a fluorine-containing group has a good compatibility with the component (A), and therefore enables the production of more uniform cured products.

The hydrogenorganopolysiloxane (B) can be prepared for example by equilibrating a compound having the formula:

a compound having the formula:

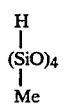

a compound having the formula:

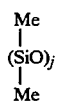

wherein j is an integer of 3 to 8, using an acid catalyst such as sulfuric acid or the like, or alternatively by cohydrolyzing corresponding halosilanes or halosiloxanes. A compound containing a special functional group such as an epoxy group, etc. can be prepared by partial addition reaction described in e.g. Japanese Patent Publication (kokoku) No. 51-33540 (1976). A compound containing a fluorine-containing group such as a fluoroalkylene group or the like can be prepared by adding a corresponding chlorosilane to a mixture of tetramethyldisiloxane and hydrochloric acid.

The hydrogenorganopolysiloxane (B) may have any structure of linear and cyclic ones. Although the molecular weight may be low or may be high, generally those having a relatively low molecular weight of 30,000 or less are used.

The compound (B) is preferably present in an amount such that the amount of the Si—H groups contained in the component (B) is preferably 0.5 to 5.0 moles, more preferably 1.2 to 3.0 moles per mole of the aliphatic unsaturated group such as vinyl, allyl and cycloalkenyl contained in the composition of the present invention. If the ratio of the Si—H groups to the aliphatic unsaturated groups is too small, the resulting crosslink degree is insufficient; if the ratio too large, foaming may occur or lowering of heat resistance, permanent compression set or the like may occur. The amount of the component (B) in the composition of the present invention satisfying the amount of Si—H groups as defined above is enough, and normally ranges from 0.1 to 50 parts by weight and preferably ranges from 0.5 to 10 parts by weight.

(C) Platinum family metal catalyst

The platinum family metal catalyst, the component (C) of the composition according to the present invention, acts as a catalyst for addition reaction (hydrosilylation) of the components (A) and (B). The platinum family metal catalyst includes, for example, platinum family metal compounds such as platinum compounds, rhodium compounds, ruthenium compounds, iridium compounds and palladium compounds. Normally used are platinum compounds that are relatively readily available. The platinum compounds include, for example, chloroplatinic acid, complexes of chloroplatinic acid and olefin such as ethylene, complexes of chloroplatinic acid and an alcohol or vinylsiloxane, solid catalysts such as a platinum/silica and platinum/carbon. The catalysts other than the platinum compounds include, for example, $PhCl(PPh_3)_3$, $RhCl(CO)(PPh_3)_2$, $RhCl(C_2H_4)_2$, $Ru(CO)_{12}$, and $IrCl(CO)(PPh_3)_2$, $Pd(PPh_3)_4$ wherein in formulas Ph stands for the phenyl group.

The amount of the platinum family metal catalyst (C) is not particularly limited. Since the catalyst is expensive, however, it is normally added in an amount of about 1 to about 1,000 ppm, preferably about 10 to about 500 ppm.

Preferably, to make the resulting cured products as uniform as possible, the component (C) is dissolved in an appropriate solvent such as flon 113, m-xylene hexafluoride, perfluorobutyltetrahydrofuran or the like before use to increase its compatibility with the component (A).

Other ingredients

To the composition of the present invention, it is possible to optionally add other various additives, which specifically include, for example, organopolysiloxane resins composed of $SiO_2$ unit, $CH_2=CH(R')_2SiO_{0.5}$ units, and $R'_3SiO_{0.5}$ units, where $R'$ is a monovalent hydrocarbon group containing no aliphatically unsaturated double bond (See Japanese Patent Publication (kokoku) Nos. 38-26771 and 45-9476) for reinforcing the strength of the cured products obtained by curing the composition according to the present invention, polysiloxanes containing $CH_2=CH(R)SiO$ units wherein R stands for the groups specified above as $R^3$ and $R^4$, for controlling the cure rate of the composition (See Japanese Patent Publication (kokoku) No. 48-10947), acetylene compounds (See U.S. Pat. No. 3,445,420 and Japanese Patent Publication (kokoku) No.54-3774), ionic heavy metal compounds (See U.S. Pat. No. 3,532,649). Further, a functional group free organopolysiloxane may be added in a suitable amount to improve thermal shock resistance, flexibility or the like.

If these additives are added, the component (B) is preferably added in such an amount that the ratio of the Si—H groups contained in the component (B) to the aliphatic unsaturated bonds in the composition is in the range described above.

Moreover, the composition of the present invention may contain a filler to reduce thermal shrinkage on curing, to reduce thermal expansion coefficient of elastic products obtained by curing, to improve thermal stability, weatherability, chemical resistance, flame retardance and mechanical strength, or to reduce gas permeability. The filler includes, for example, fumed silica, quartz powder, glass fiber, carbon black, metal oxides such as iron oxides, titanium oxide and cerium oxide, metal carbonates such as calcium carbonate and magnesium carbonate, or the like. A suitable pigment, dye or antioxidant can be optionally added.

The composition of the present invention can be dissolved in a suitable fluorine-containing solvent, e.g., m-xylene hexafluoride, fluorinate or the like, depending on use or purpose.

Cured products

The composition of the present invention containing the components (A), (B), (C) and optionally various additives is left to stand at room temperature or heated to produce a cured product according to the present invention.

The temperature for curing the composition of the present invention is different depending on the kind of functional groups contained in the component (A), and the kinds and amounts of the components (B) and (C). Curing at room temperature is possible. Usually, it can cured at 100° to 150° C. within a short time, e.g., several minutes to several hours.

Uses

The cured product obtained by curing the composition according to the present invention has a high fluorine content, and therefore exhibits good solvent resistance against either of the non-polar solvents and polar solvents as well as has good chemical resistance and heat resistance. Further, it has a low surface energy, and therefore exhibits good release properties and water repellency; hence it can be used in a variety of uses. For example, it is useful as oil seals, O rings, sealants, molded items, extruded items, coating material for various materials, release agents, etc.

EXAMPLES

Examples of the present invention will now be described below, in which "part(s)" means "part(s) by weight".

Example 1

A hundred parts of a polymer which has the following formula (8):

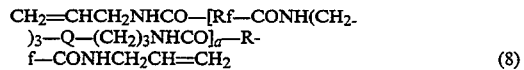

wherein a is a number with an average value of 3, Rf is a group of the formula:

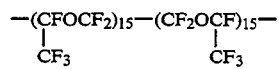

and Q is a group of the formula:

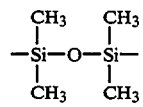

and which has a viscosity of 9,600 cSt (25° C.), an average molecular weight of 21,000 and a vinyl group content of 0.009 mol/100 g was admixed with 15 parts of trimethylsiloxyl-treated fumed silica having a specific surface area of 200 m²/g. The resulting admixture was heat-treated, then mixed on a three-roll mill, and was admixed further with 4.8 parts (0.0039 mol in terms of Si—H groups) of a hydrogenpolysiloxane having the following formula (9):

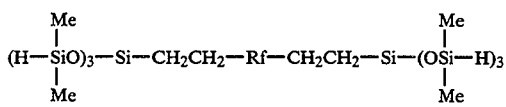   (9)

wherein Me is a methyl group, and Rf is a group represented by the formula:

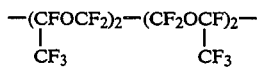

0.5 part of carbon black, 0.2 part of a toluene solution of a complex obtained by modifying chloroplatinic acid with $CH_2=CHSi(CH_3)_2OSi(CH_3)_2CH=CH_2$ (platinum concentration: 1.0% by weight) and 0.3 part of 2-ethynylisopropanol. The admixture thus obtained was degassed under a reduced pressure, then placed in a rectangularly shaped mold 2 mm in depth, and subjected again to degassing. The admixture in the mold was then press cured at 150° C. under a pressure of 120 kg/cm² for 20 minutes. The resulting sheet form cured product was measured for hardness, elongation and tensile strength according to JIS K 6301. The results are given below.

| | |
|---|---|
| Hardness (JIS-A*) | 42 |
| Elongation (%) | 240 |
| Tensile strength (kgf/cm²) | 40 |

*Hardness measurement was carried out on a Type A spring hardness tester according to JIS K 6301. The same applies hereinbelow.

Example 2

A sheet form cured product was obtained in the same manner as in Example 1 except for using 5.4 parts (0.0038 mol in terms of Si—H groups) of a hydrogenmethylsiloxane having the formula:

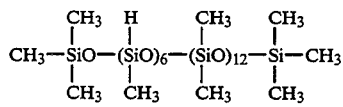

in place of the hydrogenmethylsiloxane of the above formula (9) used in Example 1. The cured product obtained was measured for hardness, elongation and tensile strength in the same manner as in Example 1. The results are given below.

| | |
|---|---|
| Hardness (JIS-A) | 39 |
| Elongation (%) | 260 |
| Tensile strength (kgf/cm²) | 36 |

Example 3

A sheet form cured product was obtained in the same manner as in Example 1 except that a polymer having the formula:

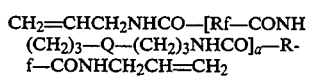

wherein a is a number with an average value of 5, Rf is a group of the formula:

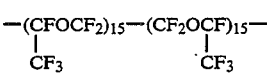

and Q is a group of the formula:

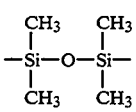

and having a viscosity of 5,400 cSt (25° C.), an average molecular weight of 11,600 and a vinyl group content of 0.017 mol/100 g was used, in place of the polymer of the formula (8) above in Example 1, in an amount of 100 parts and a hydrogenmethylsiloxane having the formula (9) was used in an amount of 6.5 parts (0.0053 mol in terms of Si—H groups). The cured product obtained was measured for hardness, elongation and tensile strength in the same manner as in Example 1. The results are given below.

| | |
|---|---|
| Hardness (JIS-A) | 48 |
| Elongation (%) | 170 |
| Tensile strength (kgf/cm²) | 34 |

Example b 4

A sheet form cured product was obtained in the same manner as in Example 1 except that a polymer having the formula:

$CH_2=CHCH_2NHCO-[Rf-CONH(CH_2-)_3-Q-(CH_2)_3NHCO]_a-R-f-CONHCH_2CH=CH_2$ wherein a is a number with an average value of 10, Rf is a group of the formula:

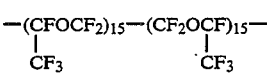

and Q is a group of the formula:

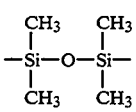

and having a viscosity of 12,400 cSt (25° C.), an average molecular weight of 11,600 and a vinyl group content of 0.017 mol/100 g was used, in place of the polymer of the formula (8) above in Example 1, in an amount of 100 parts and a hydrogenmethylsiloxane having the formula (9) was used in an amount of 6.5 parts (0.0054 mol in terms of Si—H groups). The cured product obtained was measured for hardness, elongation and tensile strength in the same manner as in Example 1. The results are given below.

| | |
|---|---|
| Hardness (JIS-A) | 54 |
| Elongation (%) | 160 |

$CH_2=CHCH_2NHCO-[Rf-CONH(CH_2)_3-Q-(CH_2)_3NHCO]_a-R-f-CONHCH_2CH=CH_2$

Example 5

A sheet form cured product was obtained in the same manner as in Example 1 except that a polymer having the formula:

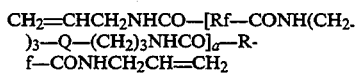

wherein a is a number with an average value of 3, Rf is a group of the formula:

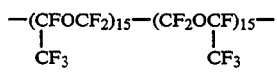

and Q is a group of the formula:

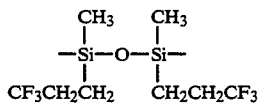

and having a viscosity of 7,500 cSt (25° C.), an average molecular weight of 21,000 and a vinyl group content of 0.009 mol/100 g was used, in place of the polymer of the formula (8) above in Example 1, in an amount of 100 parts and a hydrogenmethylsiloxane having the formula (9) was used in an amount of 5.5 parts (0.0045 mol in terms of Si—H groups). The cured product obtained was measured for hardness, elongation and tensile strength in the same manner as in Example 1. The results are given below.

| | |
|---|---|
| Hardness (JIS-A) | 48 |
| Elongation (%) | 170 |
| Tensile strength (kgf/cm²) | 34 |

Example 6

The cured sheets obtained in Examples 1 to 5 above were evaluated with respect to chemical resistance by the volume change observed after immersion in aqueous acid or alkali solutions at 25° C. for 7 days. As a comparative example, a silicone rubber (product name: KE-951, product by Shin-Etsu Chemical Co., Ltd.) was tested for chemical resistance in the same manner. The results are given in Table 1.

TABLE 1

| 10% Aqueous solution of | Volume change ΔV (%) | | | | | |
|---|---|---|---|---|---|---|
| | Ex. 1 | Ex. 2 | Ex. 3 | Ex. 4 | Ex. 5 | Silicone rubber |
| NaOH | 0 | 0 | 0 | 0 | 0 | 0 |
| HCl | 0 | 0 | 0 | 0 | 0 | 2 |
| HNO₃ | 0 | 0 | 1 | 1 | 2 | 8 |
| H₂SO₄ | 0 | 0 | 1 | 2 | 2 | 5 |

Example 7

The cured sheets obtained in Examples 1 to 5 above were evaluated with respect to solvent resistance by the volume change observed after immersion in solvents at 25° C. for 7 days. As a comparative example, a fluororubber (product name: Viton E-60C, product by du-Pont) was tested for solvent resistance in the same manner. The results are given in Table 2.

TABLE 2

| Solvent | Volume change ΔV (%) | | | | | |
|---|---|---|---|---|---|---|
| | Ex. 1 | Ex. 2 | Ex. 3 | Ex. 4 | Ex. 5 | Fluororubber |
| Toluene | 6 | 11 | 5 | 4 | 4 | 8 |
| n-Hexane | 11 | 14 | 9 | 8 | 5 | 1 |
| Methanol | 6 | 4 | 8 | 11 | 2 | 92 |
| Methyl ethyl ketone | 15 | 16 | 20 | 20 | 35 | 240 |

Example 8

The cured sheet obtained in Example 1 was tested for heat resistance by heating at 200° C. for 120 hours. The results are given in Table 3.

TABLE 3

| | Initial | After heated at 200° C. for 120 hours |
|---|---|---|
| Hardness (JIS-A) | 42 | 43 |
| Elongation (%) | 240 | 230 |
| Tensile strength (kgf/cm²) | 40 | 42 |
| Weight loss on heating (%) | — | 0.8 |

Example 9

A hundred parts of a polymer which has the following formula (10):

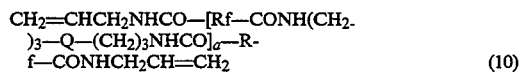

wherein a is a number with an average value of 3, and Rf and Q are the groups as follows:

Rf:

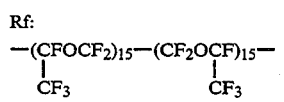

Q:

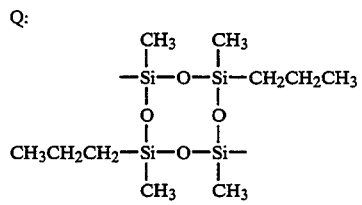

and which has a viscosity of 8,800 cSt (25° C.), an average molecular weight of 15,000 and a vinyl group content of 0.013 mol/100 g was admixed with 15 parts of trimethylsiloxyl-treated fumed silica having a specific surface area of 200 m²/g. The resulting admixture was heat-treated, then mixed on a three-roll mill, and was admixed further with 5.3 parts (0.0043 mol in terms of Si—H groups) of a hydrogenmethylsiloxane having the following formula (11):

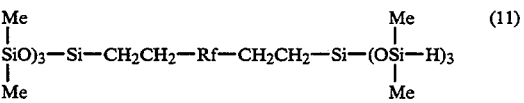

Rf:

-continued

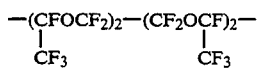

0.47 part of carbon black, 0.2 part of a toluene solution of a complex obtained by modifying chloroplatinic acid with $CH_2=CHSi(CH_3)_2OSi(CH_3)_2CH=CH_2$ (platinum concentration: 1.0% by weight) and 0.002 part of 2-ethynylisopropanol. The admixture thus obtained was degassed under a reduced pressure, then placed in a rectangularly shaped mold 2 mm in depth, and subjected again to degassing. The admixture in the mold was then press cured at 150° C. under a pressure of 120 kg/cm² for 20 minutes. The resulting sheet form cured product was measured for hardness, elongation and tensile strength in the same manner as in Example 1. The results are given below.

| | |
|---|---|
| Hardness (JIS-A) | 46 |
| Elongation (%) | 180 |
| Tensile strength (kgf/cm²) | 37 |

Example 10

A sheet form cured product was obtained in the same manner as in Example 9 except for using 6.1 parts (0.0043 mol in terms of Si—H groups) of a hydrogenmethylsiloxane having the formula:

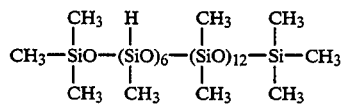

in place of the hydrogenmethylsiloxane of the above formula (11) used in Example 9. The cured product obtained was measured for hardness, elongation and tensile strength in the same manner as in Example 1. The results are given below.

| | |
|---|---|
| Hardness (JIS-A) | 42 |
| Elongation (%) | 210 |
| Tensile strength (kgf/cm²) | 35 |

Example 11

A sheet form cured product was obtained in the same manner as in Example 9 except that a polymer having the formula:

$CH_2=CHCH_2NHCO-[Rf-CONH(CH_2-)_3-Q-(CH_2)_3NHCO]_a-R-f-CONHCH_2CH=CH_2$ wherein a is a number with an average value of 5, and Rf and Q are the groups as follows:

Rf:

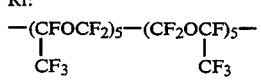

Q:

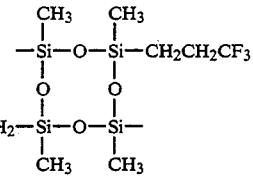

and having a viscosity of 6,300 cSt (25° C.), an average molecular weight of 13,200 and a vinyl group content of 0.015 mol/100 g was used, in place of the polymer of the formula (10) above in Example 9, in an amount of 100 parts and a hydrogenmethylsiloxane having the formula (11) was used in an amount of 6.1 parts (0.0050 mol in terms of Si—H groups). The cured product obtained was measured for hardness, elongation and tensile strength in the same manner as in Example 1. The results are given below.

| | |
|---|---|
| Hardness (JIS-A) | 52 |
| Elongation (%) | 150 |
| Tensile strength (kgf/cm²) | 33 |

Example 12

A sheet form cured product was obtained in the same manner as in Example 9 except that a polymer having the formula:

$CH_2=CHCH_2NHCO-[Rf-CONH(CH_2-)_3-Q-(CH_2)_3NHCO]_a-R-f-CONHCH_2CH=CH_2$ wherein a is a number with an average value of 10, and Rf and Q are the groups as follows:

Rf:

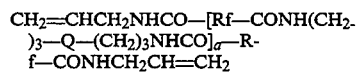

Q:

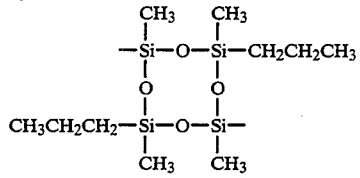

and having a viscosity of 13,200 cSt (25° C.), an average molecular weight of 13,800 and a vinyl group content of 0.014 mol/100 g was used, in place of the polymer of the formula (10) above in Example 9, in an amount of 100 parts and a hydrogenmethylsiloxane having the formula (11) was used in an amount of 5.7 parts (0.0047 mol in terms of Si—H groups). The cured product obtained was measured for hardness, elongation and tensile strength in the same manner as in Example 1. The results are given below.

| | |
|---|---|
| Hardness (JIS-A) | 54 |
| Elongation (%) | 160 |
| Tensile strength (kgf/cm²) | 35 |

Example 13

The cured sheets obtained in Examples 9 to 12 above were evaluated with respect to chemical resistance by the volume change observed after immersion in aqueous acid or alkali solutions at 25° C. for 7 days. As a comparative example, a silicone rubber (product name: KE-951, product by Shin-Etsu Chemical Co., Ltd.) was tested for chemical resistance in the same manner. The results are given in Table 4.

TABLE 4

| 10% Aqueous solution of | Volume change ΔV (%) | | | | |
|---|---|---|---|---|---|
| | Ex. 9 | Ex. 10 | Ex. 11 | Ex. 12 | Silicone rubber |
| NaOH | 0 | 0 | 0 | 0 | 0 |
| HCl | 0 | 0 | 0 | 0 | 2 |
| HNO$_3$ | 0 | 2 | 1 | 1 | 8 |
| H$_2$SO$_4$ | 0 | 2 | 1 | 2 | 5 |

Example 14

The cured sheets obtained in Examples 9 to 12 above were evaluated with respect to solvent resistance by the volume change observed after immersion in solvents at 25° C. for 7 days. As a comparative example, a fluororubber (product name: Viton E-60C, product by du-Pont) was tested for solvent resistance in the same manner. The results are given in Table 5.

TABLE 5

| Solvent | Volume change ΔV (%) | | | | |
|---|---|---|---|---|---|
| | Ex. 9 | Ex. 10 | Ex. 11 | Ex. 12 | Fluororubber |
| Toluene | 6 | 12 | 5 | 4 | 8 |
| n-Hexane | 11 | 16 | 10 | 9 | 1 |
| Methanol | 6 | 5 | 9 | 12 | 92 |
| Methyl ethyl ketone | 17 | 19 | 20 | 22 | 240 |

Example 15

The cured sheet obtained in Example 9 was tested for heat resistance in the same manner as in Example 8. The results are given in Table 6.

TABLE 6

| | Initial | After heated at 200° C. for 120 hours |
|---|---|---|
| Hardness (JIS A) | 52 | 53 |
| Elongation (%) | 150 | 150 |
| Tensile strength (kgf/cm$^2$) | 33 | 35 |
| Weight loss on heating (%) | — | 1.3 |

What is claimed is:

1. A room temperature curable fluorine-containing organopolysiloxane composition comprising:
   (A) a fluorine-containing compound having the general formula (1):

$$R^2-NHCO-[Rf-CONH-R^1-Q-R^1-NH-CO]_a-Rf-CONH-R^2 \quad (1)$$

wherein a is an integer of 0 or more, Rf is a divalent perfluoroalkylene group or a divalent perfluoropolyether group, $R^1$ is a divalent hydrocarbon group, $R^2$ is a monovalent aliphatic unsaturated group-containing hydrocarbon group, and Q is a siloxane group having the general formula:

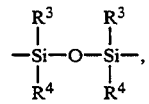
(2)

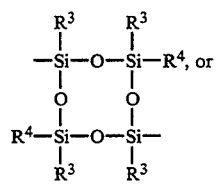
(3)

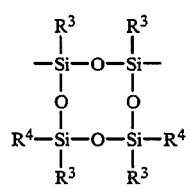
(4)

wherein in the formulas (2), (3) and (4) $R^3$ and $R^4$ may be the same or different and are each a monovalent unsubstituted or substituted hydrocarbon group, (B) a hydrogenorganopolysiloxane containing at least two Si—H groups in its molecule, and
   (C) a platinum family metal catalyst.

2. The composition of claim 1, wherein Q in the general formula (1) is

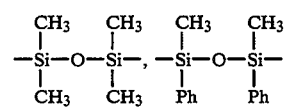

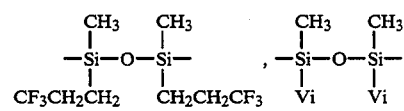

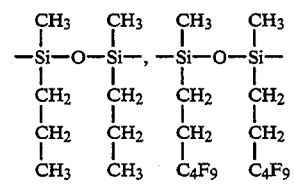

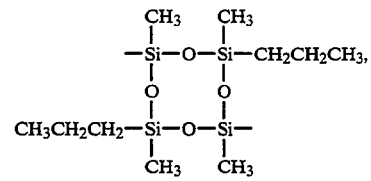

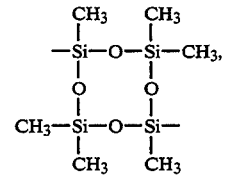

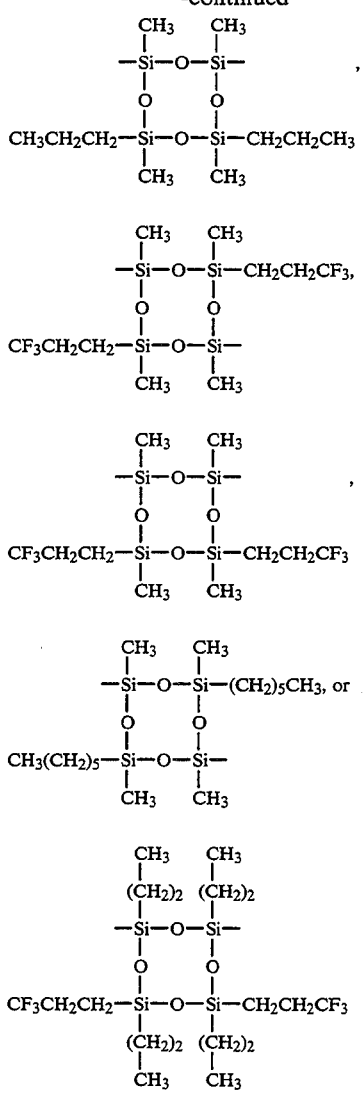

wherein Ph stands for the phenyl group and Vi stands for the vinyl group.

3. The composition of claim 1, wherein Rf in the general formula (1) is represented by

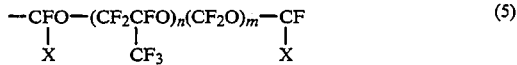

wherein m is an integer of 0 to 10, n is an integer of 2 to 50, and a plurality of X may be the same or different and are a fluorine atom or a group of —$CF_3$, a group having the general formula (6):

$$-(CF_2CF_2CF_2O)_k-CF_2CF_2- \qquad (6)$$

wherein k is an integer of 1 to 100, or a group having the general formula (7):

$$-(CF_2CFOCF_2)_e(CFOCF_2)_f(CF_2)_g(CF_2OCF)_h(CF_2OCF_2CF_2)_i- \qquad (7)$$
$$\phantom{-(CF_2CFOCF_2)_e}Y\phantom{(CFOCF_2)_f}CF_3\phantom{(CF_2)_g(CF_2OCF_2)_h}CF_3\phantom{(CF_2OCF_2CF_2)_i-}Y$$

wherein e and i may be the same or different and are each 0 or 1, f and h may be the same or different and are each a integer of 0 to 30, and g is an integer of 0 to 8, provided that e, f, g, h and i satisfy (e+f+g+h+i)≧1, and a plurality of Y may be the same or different and are a fluorine atom or the group of —$CF_3$.

4. The composition of claim 1, wherein the hydrogenorganopolysiloxane (B) contains fluorine.

5. The composition of claim 1, wherein the component (B) is present in an amount such that the amount of the Si—H groups contained in the component (B) is 0.5 to 5.0 moles per mole of aliphatic unsaturated groups contained in the composition.

6. The composition of claim 1, wherein the component (B) is present in an amount of 0.1 to 50 parts by weight per 100 parts by weight of the component (A).

7. The composition of claim 1, wherein the component (C) is a platinum catalyst.

8. The composition of claim 1, wherein the component (C) is present in an amount of 1 to 1,000 ppm based on the total amount of the components (A) and (B).

* * * * *